(12) United States Patent
Kinross et al.

(10) Patent No.: US 7,584,574 B2
(45) Date of Patent: Sep. 8, 2009

(54) SLIDING WINDOW ASSEMBLY HAVING A REMOVABLE SLIDING PANEL

(75) Inventors: Brian Kinross, Florence, KY (US); Steve Ganser, Marcellus, MI (US)

(73) Assignee: AGC Automotive Americas Co., Florence, KY (US)

( * ) Notice: Subject to any disclaimer, the term of this patent is extended or adjusted under 35 U.S.C. 154(b) by 269 days.

(21) Appl. No.: 10/928,048

(22) Filed: Aug. 27, 2004

(65) Prior Publication Data

US 2005/0044799 A1    Mar. 3, 2005

Related U.S. Application Data

(60) Provisional application No. 60/499,235, filed on Aug. 29, 2003.

(51) Int. Cl.
*E05D 15/06* (2006.01)
(52) U.S. Cl. .............................. 49/413; 49/453; 49/454; 49/209; 49/380
(58) Field of Classification Search ........... 49/209–211, 49/213, 413, 380, 116, 118, 123, 453, 454, 49/455, 456, 457; 16/95 R, 96 R
See application file for complete search history.

(56) References Cited

U.S. PATENT DOCUMENTS

| | | | | | |
|---|---|---|---|---|---|
| 628,104 | A | * | 7/1899 | Marshall | .................. 49/149 |
| 661,657 | A | * | 11/1900 | Finneke | .................. 49/448 |
| 928,137 | A | * | 7/1909 | Lewis | .................. 16/96 R |
| 2,798,246 | A | * | 7/1957 | Holloway | ................ 16/95 R |
| 2,815,543 | A | * | 12/1957 | Gates | ........................ 49/411 |
| 2,992,460 | A | | 7/1961 | Hentges | |
| 3,587,131 | A | * | 6/1971 | Graf | ............................ 16/95 R |
| 3,808,742 | A | | 5/1974 | Ehret et al. | |
| 3,841,024 | A | | 10/1974 | Cheng | |
| 4,042,004 | A | | 8/1977 | Kwan | |
| 4,281,477 | A | * | 8/1981 | Kaminaga | .................. 49/453 |
| 4,384,429 | A | | 5/1983 | Rokicki et al. | |
| 4,561,224 | A | | 12/1985 | Jelens | |
| 4,788,796 | A | | 12/1988 | Matthews | |
| 5,473,840 | A | | 12/1995 | Gillen et al. | |
| 5,505,023 | A | | 4/1996 | Gillen et al. | |

(Continued)

FOREIGN PATENT DOCUMENTS

FR         2833211 A     6/2003

OTHER PUBLICATIONS

International Search Report of PCT International Application No. PCT/US2004/027650; Aug. 27, 2004.

*Primary Examiner*—Gregory J. Strimbu
(74) *Attorney, Agent, or Firm*—Howard & Howard Attorneys PLLC

(57) ABSTRACT

A sliding window assembly for a vehicle includes a track member defining a channel. The track member further defines a gap that extends laterally into the channel having a gap length along the track member. The sliding window assembly further includes a sliding panel having an edge. The sliding window assembly includes a shoe extending from the sliding panel and engages the track member to support the sliding panel on the track member. The shoe has a shoe length that is parallel with the track member. The shoe length is less than the gap length to allow for removal of the sliding panel by aligning and passing the shoe through the gap.

12 Claims, 10 Drawing Sheets

U.S. PATENT DOCUMENTS

| | | |
|---|---|---|
| 5,522,191 A | 6/1996 | Wenner et al. |
| 5,531,046 A | 7/1996 | Kollar et al. |
| 5,542,214 A | 8/1996 | Buening |
| 5,613,323 A | 3/1997 | Buening |
| 5,895,089 A * | 4/1999 | Singh et al. .................. 296/207 |
| 5,996,284 A * | 12/1999 | Freimark et al. ............... 49/209 |
| 5,996,285 A | 12/1999 | Guillemet et al. |
| 6,018,913 A | 2/2000 | Lin |
| 6,026,611 A | 2/2000 | Ralston et al. |
| 6,098,342 A * | 8/2000 | Bischof et al. ................ 49/409 |
| 6,119,401 A | 9/2000 | Lin et al. |
| 6,286,891 B1 | 9/2001 | Gage et al. |
| 6,324,788 B1 | 12/2001 | Koneval et al. |
| 6,591,552 B1 * | 7/2003 | Rasmussen ................... 49/413 |
| 2002/0148163 A1 | 10/2002 | Warner et al. |
| 2003/0213179 A1 | 11/2003 | Galer |
| 2004/0025439 A1 | 2/2004 | Purcell |

* cited by examiner

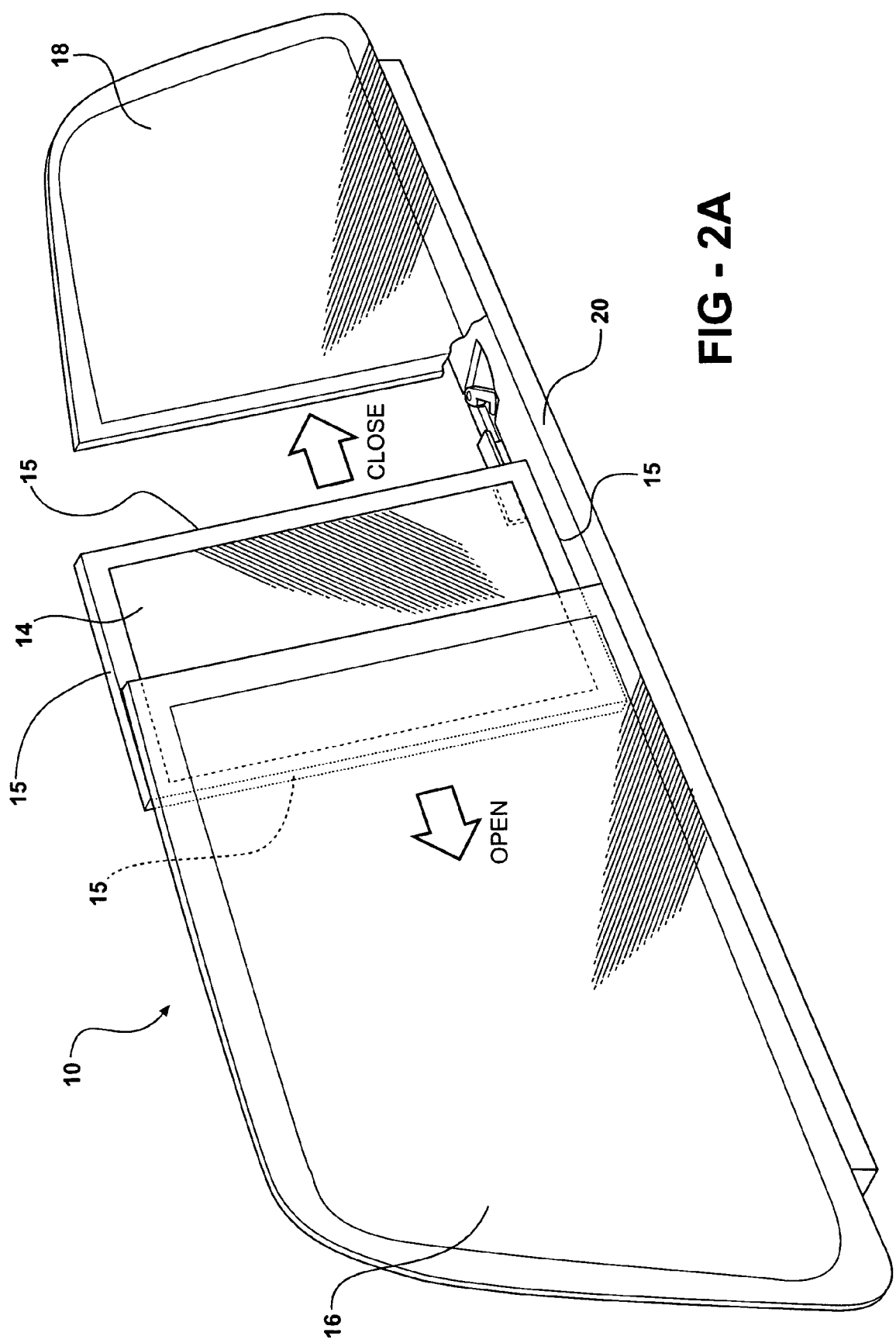

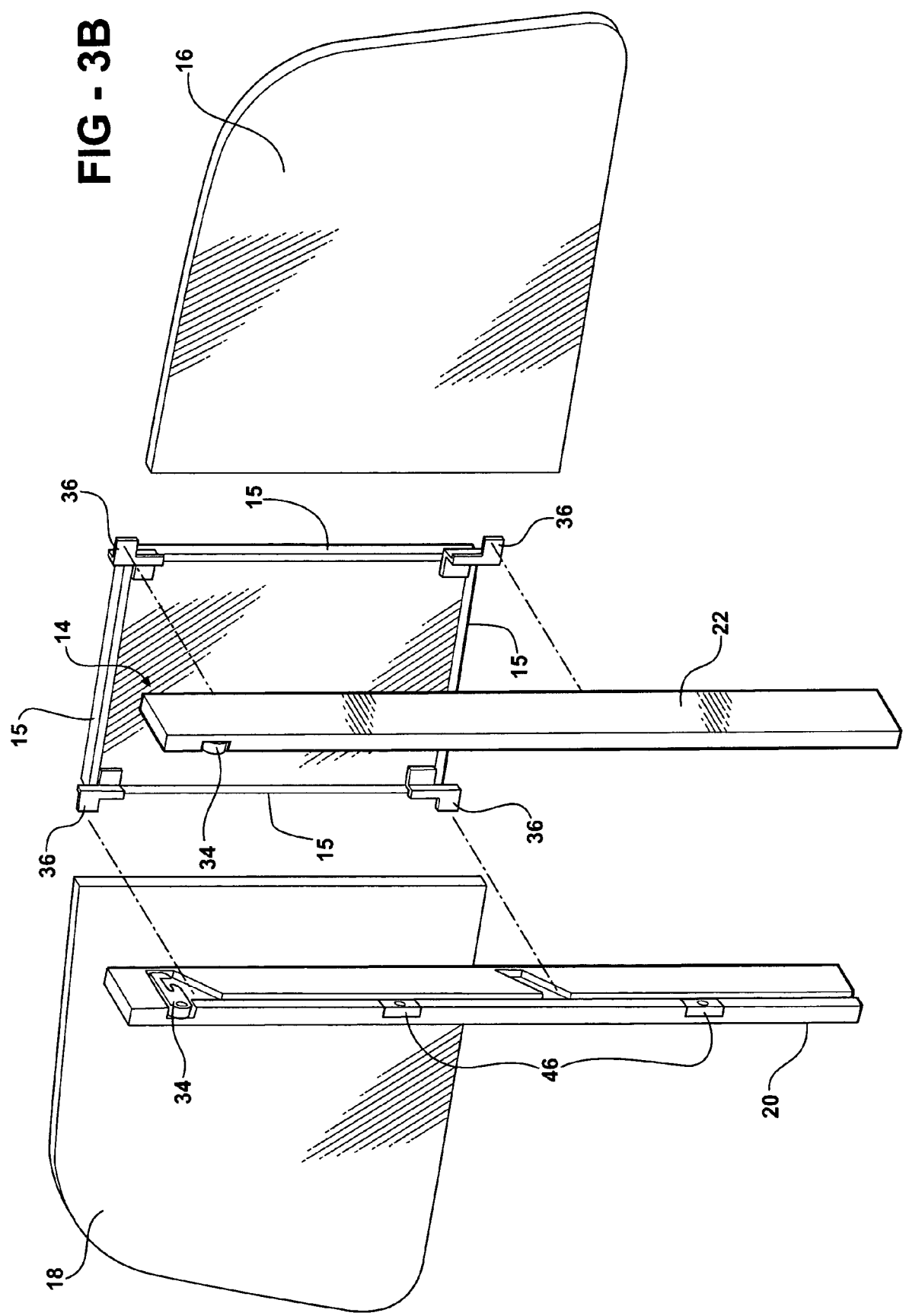

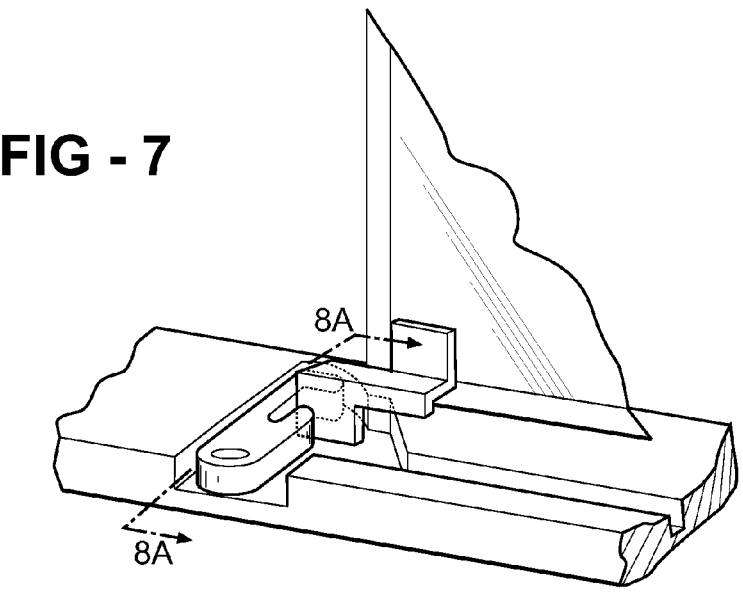
FIG - 7
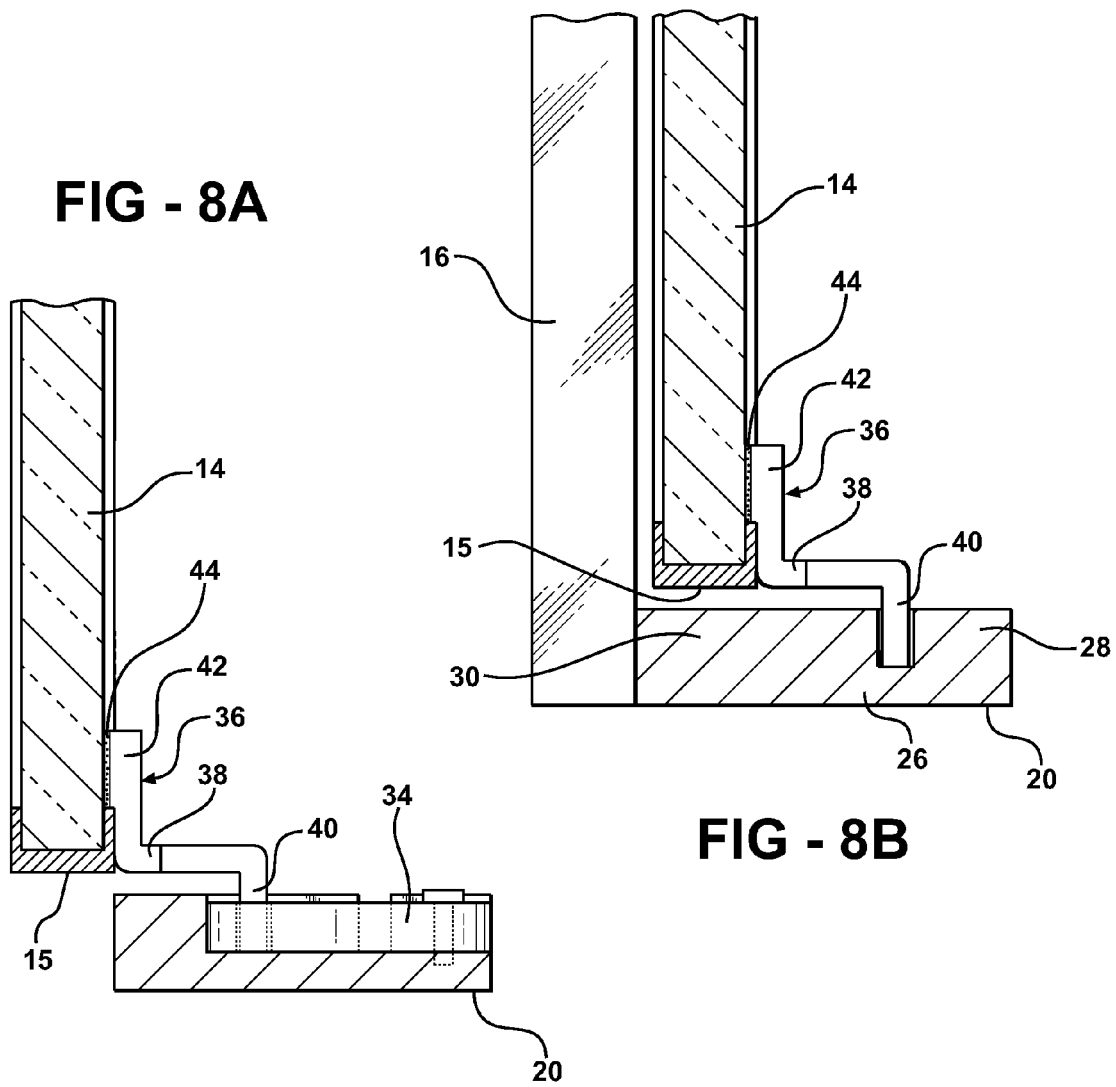
FIG - 8A
FIG - 8B

SLIDING WINDOW ASSEMBLY HAVING A REMOVABLE SLIDING PANEL

CROSS-REFERENCES TO RELATED APPLICATIONS

The subject patent application claims priority to and all the benefits of U.S. Provisional Patent Application Ser. No. 60/499,235, which was filed on Aug. 29, 2003.

BACKGROUND OF THE INVENTION

1. Field of the Invention

The subject invention generally relates to a sliding window assembly, particularly for a vehicle, wherein a sliding panel is removable from the window assembly.

2. Description of the Related Art

Various sliding window assemblies for vehicles are known in the prior art. Examples of such a window assembly are disclosed in U.S. Pat. No. 5,542,214 to Buening (the '214 patent) and U.S. Pat. No. 4,788,796 to Matthews (the '796 patent).

The sliding window assembly disclosed in the '214 patent includes several embodiments. In all of the embodiments, a sliding pane or panel having a rectangular shape, including a top and bottom, is guided between an open and closed position. The sliding panel includes a member or pin extending from both the top and bottom of the sliding panel. The sliding window assembly includes a frame that has a top and bottom track member each defining a guide channel. Either the top or bottom pins are biased in a vertical direction to permit the pins to be retracted to enter or escape the guide channels. Although removal is not a focus of the '214 patent, removal of the sliding panel can be accomplished by retracting the pins to create a clearance, which allows the sliding panel to be removed from the opposing guide channel. The pins must retract enough to create the clearance for the pins on the opposing side of the sliding panel to be completely removed from the guide channel. Because the pins in the '214 patent are biased and retractable, they are not rigid and are susceptible to movement in the vertical direction during movement of the sliding panel between the closed and open position. The vertical movement allowed by the pins increases the possibility of misalignment of the sliding panel and introduces a greater chance for rattle or undesirable vibration during the operation of the sliding window assembly.

The '796 patent also discloses a sliding window assembly. However, the sliding window assembly of the '796 patent does focus primarily on a removable feature of panels in the sliding window assembly. More specifically, the sliding window assembly includes a rectangular frame having an upper and lower portion each including a plurality of adjacent track members opening inwards. The sliding window assembly further includes a plurality of sliding panels engaged in the track members that are able to slide horizontally to create an opening. The upper portion has an aperture for receiving a pin. The pin slides into the aperture and across the track member of the upper portion. The pin is engaged by a ball detent connected to the upper portion. The ball detent locks the pin in the aperture of the upper portion. The sliding panel is removed by retracting the pin and raising the sliding panel in the track member until the sliding panel is removed from engagement with the track member of the lower portion. The sliding panel is then tilted and lowered to remove the sliding panel from the track member of the upper portion. The pin is not continuous and only engages the sliding panel over a small length of the track member of the upper portion. This is undesirable due to the possibility of the panels being misaligned or rattling during the operation of the sliding window assembly or vehicle.

Therefore, the prior art does not address a sliding window assembly that supports the sliding panel on the track member to reduce the possibility of misalignment and vibration during the operation of the sliding window assembly. Furthermore, the prior art does not attain the required support for smooth operation of the sliding window while still allowing the sliding panel to be easily removed from the track members. Therefore, it is desirable to provide a sliding window assembly that combines a simple design to support the sliding panel without additional clearance to accommodate the removal of the sliding panel from the track member for installation or servicing of the sliding panel.

SUMMARY OF THE INVENTION AND ADVANTAGES

The invention provides a sliding window assembly for a vehicle. The sliding window assembly includes a sliding panel and a track member defining a channel. The sliding panel has an edge and is moveable along the track member between an open position and a closed position. The sliding panel includes a shoe extending from the sliding panel into the channel for supporting the sliding panel on the track member as the sliding panel moves between the open and closed positions. The shoe has a shoe length parallel with the track member. The track member defines a gap that extends laterally into the channel and has a gap length along the track member. The shoe length is less than the gap length to allow the shoe to pass through the gap for removing the sliding panel from the channel of the track member.

Accordingly, the combination of the shoe length and the gap length allows for easy removal of the sliding panel. The removal of the sliding window assembly is accomplished by aligning the shoe with the gap to provide a sliding window assembly having a sliding panel that can easily be replaced or serviced over the life of the sliding window assembly. The shoe engages the track member by extending into the channel of the track member to provide stable support for the sliding panel, to provide smooth movement free of rattles and vibrations as the sliding panel moves between the open and closed positions.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 2A is a perspective view of a preferred embodiment of the sliding window assembly with the sliding panel horizontally movable between an open and a closed position;

FIG. 3B is an exploded view of an alternative embodiment of a sliding window assembly;

FIG. 7 is a detailed partial perspective view of the sliding window assembly with the sliding panel in a closed position;

FIG. 8A is a partial cross-sectional view of the sliding panel engaged in the track member in the closed position taken along line 8A-8A in FIG. 7;

FIG. 8B is a partial cross-sectional view of the sliding panel engaged in the track member in a open position taken along line 8B-8B in FIG. 4;

DETAILED DESCRIPTION OF THE INVENTION

Figure 1:
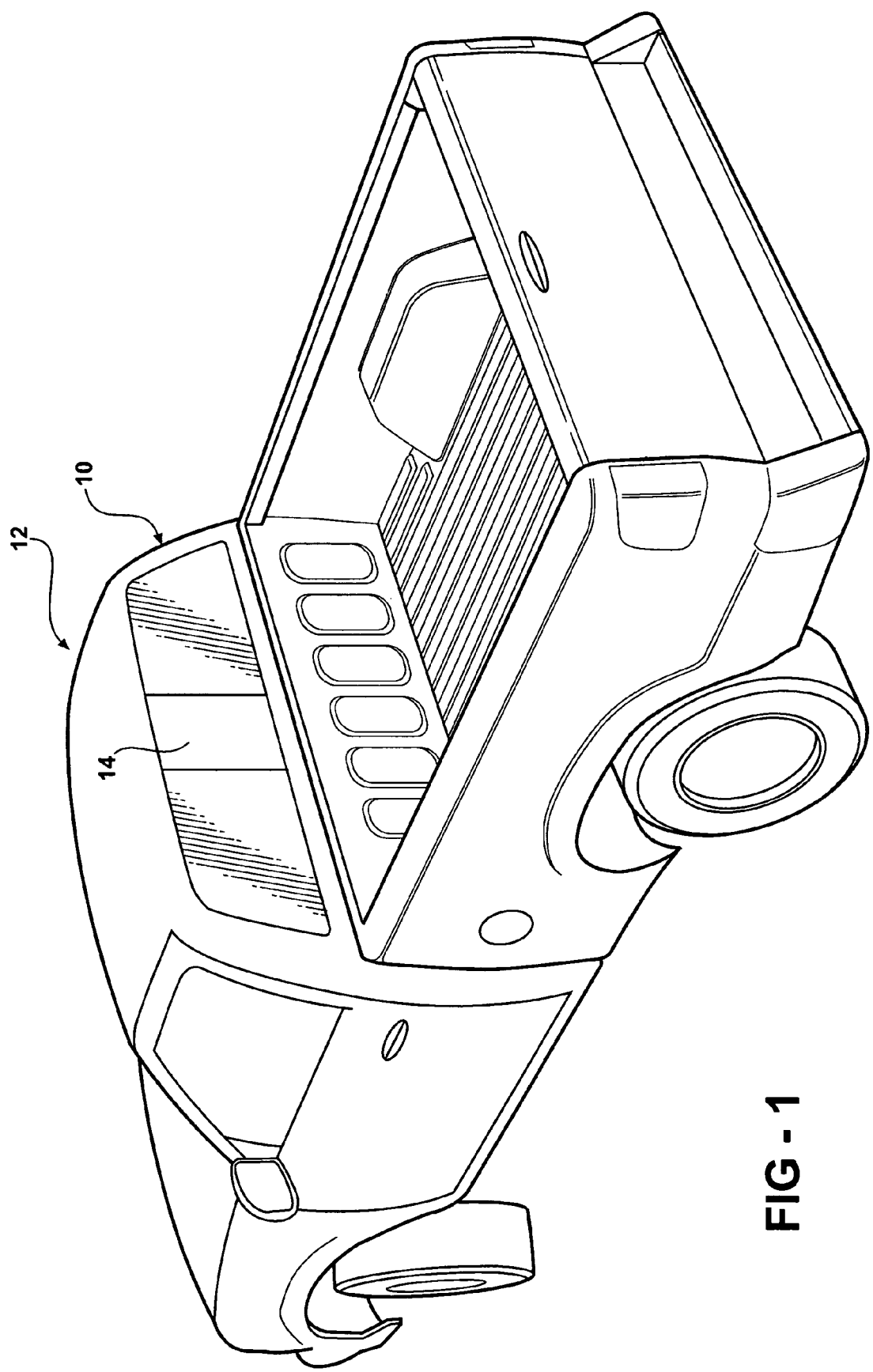
FIG. 1 is a perspective view of a vehicle with a sliding window assembly implemented as a backlite of the vehicle.

Referring to the Figures, wherein like numerals indicate like parts throughout the several views, a sliding window assembly is generally shown at 10. Referring to FIG. 1, the sliding window assembly 10 is shown in a vehicle 12, specifically as a backlite in a pickup truck. However, it is to be appreciated that the sliding window assembly 10 of the present invention can be implemented in other types of vehicles, as well as in non-vehicle applications.

Referring to FIG. 2A, the sliding window assembly 10 includes a sliding panel 14 that moves between an open and a closed position. The sliding panel has an edge 15, and in the preferred embodiment the sliding panel 14 is rectangular in shape having four edges 15. However, the shape and orientation of the sliding panel 14 is adaptable as one skilled in the art would understand.

The sliding window assembly 10 includes at least one fixed panel 16, 18 that is fixed and disposed in the same plane as and abutting the sliding panel 14 in the closed position. In the preferred embodiment the assembly further includes a pair of fixed panels 16, 18, i.e., a first and second fixed panel, in a spaced relationship defining an opening therebetween. It is understood by one skilled in the art, that the fixed panels 16, 18 are operatively connected to a track member 20, 22, typically with an adhesive or other adequate connection methods. The track member 20, 22 is described additionally below. The sliding panel 14 moves between the open and closed positions modifying the size of the opening defined by the fixed panels 16, 18. When the sliding panel 14 is in the closed position, the fixed panels 16, 18 and the sliding panel 14 are abutting in the same plane to create a flush and substantially uniform exterior appearance. The sliding panel 14 and the fixed panels 16, 18 are preferably formed of glass, but may be formed of plastic, metal or any other suitable material.

Figure 2B:
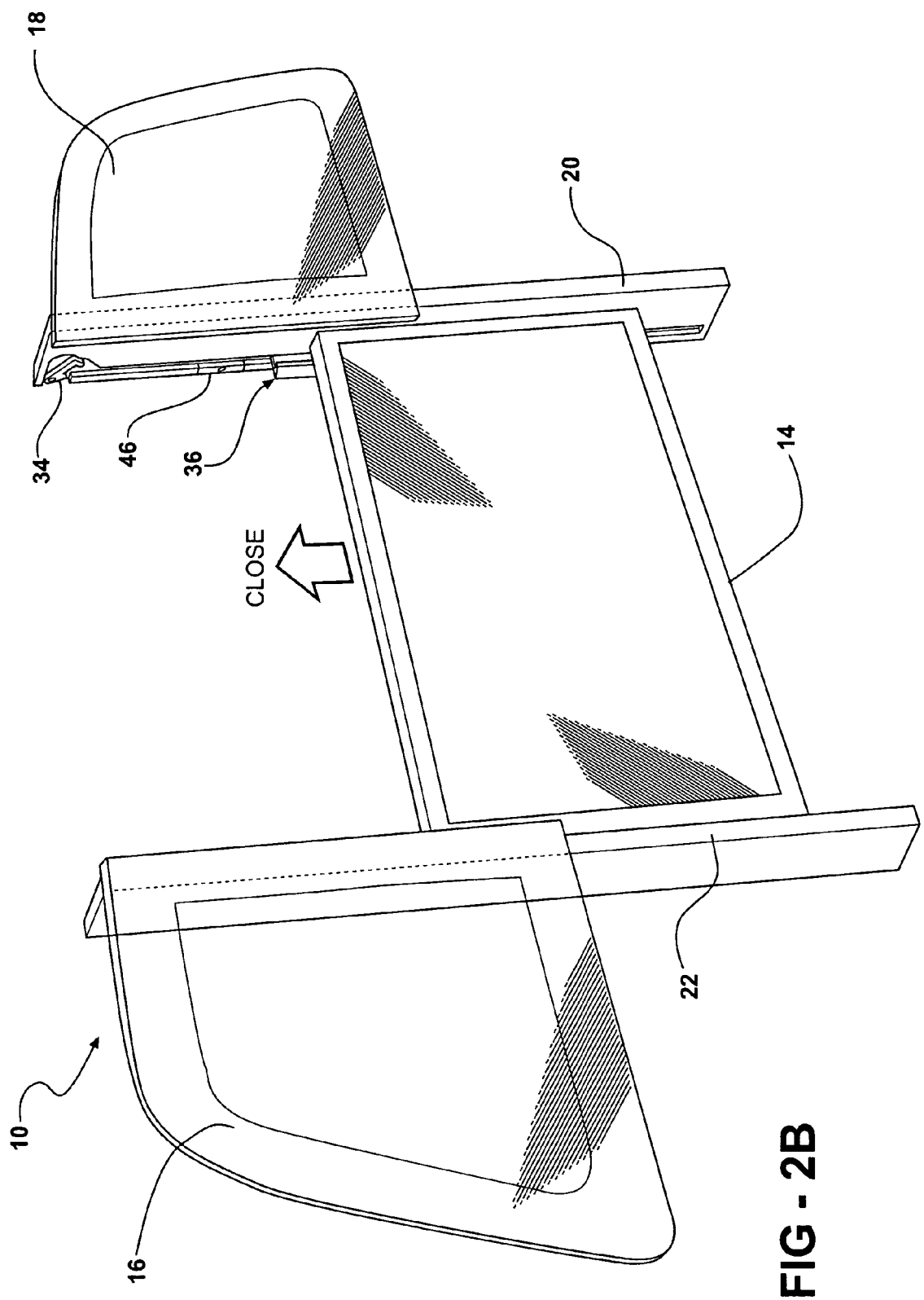
FIG. 2B is a perspective view of an alternative embodiment of the sliding window assembly with the sliding panel vertically movable between the open and the closed position.

The preferred embodiment is a sliding widow assembly 10, as shown in FIG. 2A, where the sliding panel 14 slides horizontally between the open and closed position. However, the sliding window assembly 10 can be applied independent of orientation, i.e., to both a horizontal and vertical sliding window assembly. Accordingly, FIG. 2B illustrates an alternative embodiment where the sliding window assembly 10 is adapted such that the sliding panel 14 slides vertically between the open and closed position.

Figure 3A:
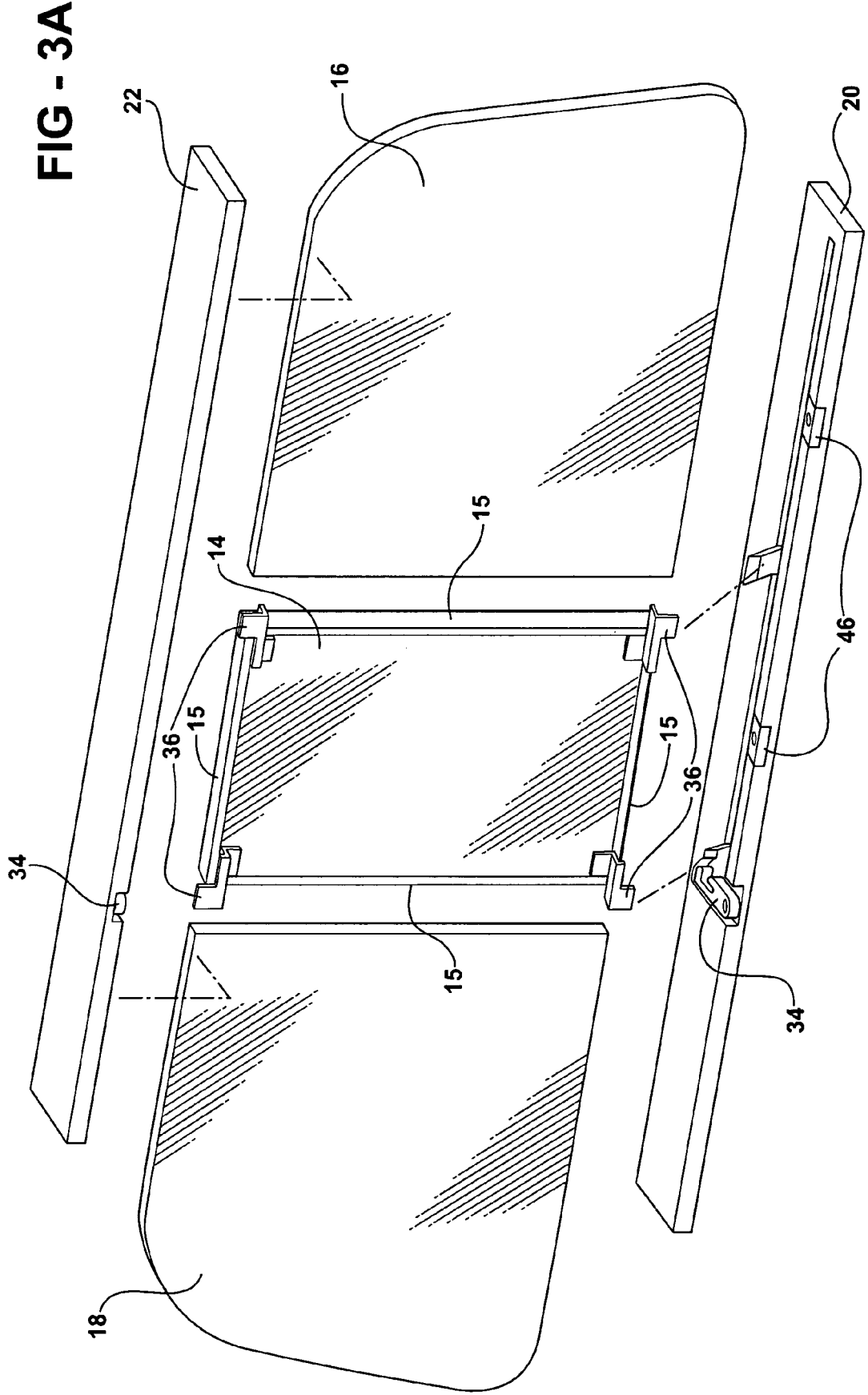
FIG. 3A is an exploded view of the preferred embodiment of the sliding window assembly.

As shown in FIG. 3A, the preferred embodiment of the sliding window assembly 10 further includes a pair of the track members 20, 22. The pair of track members, i.e., a first and second track member 20, 22, are disposed in opposing and parallel relationship along two opposite edges 15 of the sliding panel 14. However, those skilled in the art appreciate that the assembly can be implemented with only one track member 20 interfacing with the sliding panel 14. FIG. 3B illustrates an alternative embodiment where the track members 20, 22 of the sliding window assembly 10 are adapted for orienting the sliding panel 14 for movement in the vertical direction.

Each of the track members 20, 22 further defines a channel 24. The track member 20, 22 includes a base 26, a front wall 28 and a back wall 30 extending from the base 26. Preferably, the back wall 30 is spaced from and parallel to the front wall 28 and extends from the base 26 in the same direction as the front wall 28. The channel 24 is defined by the space between the front and back walls 28, 30, therefore the channel 24 is generally a U-shaped channel. However, it is to be understood that other uniquely-shaped track members and channels are possible. Each of the track members 20, 22 further define a gap 32 located in the front wall 28. The gap 32 extends laterally into the channel 24 and has a gap length Lg along the track members 20, 22. The track members 20, 22 preferably include a cam mechanism 34 for guiding the sliding panel 14 laterally from the closed to the open position. The cam mechanism 34 will be described below.

Figure 4:
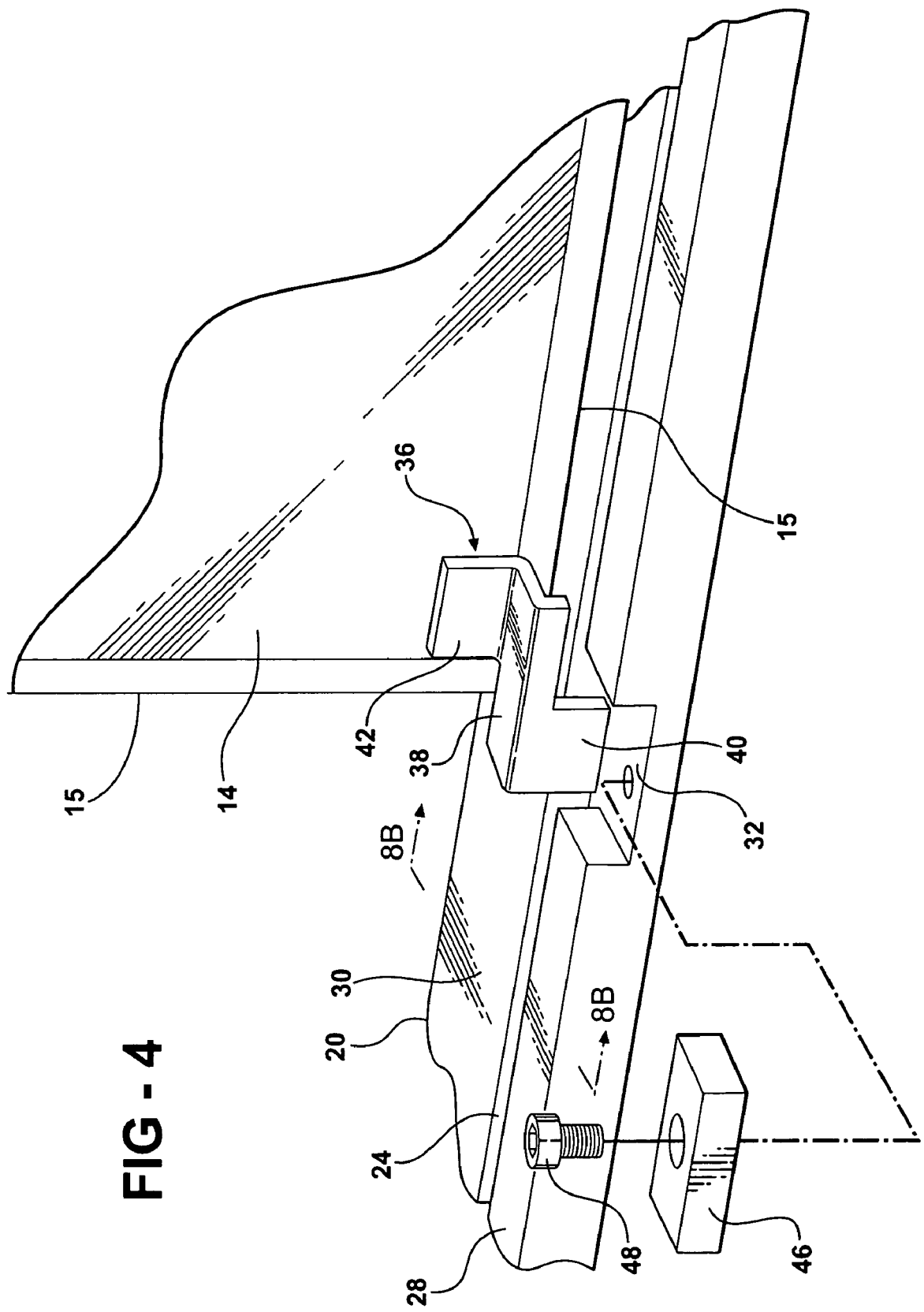
FIG. 4 is a detailed partial perspective view of the sliding window assembly.

Referring to FIG. 4, the sliding window assembly 10 includes a shoe 36 extending from the sliding panel 14 into the channel 24 of the track member 20, 22 for supporting the sliding panel 14 on the track member 20, 22. The shoe 36 is guided by the channel 24 of the track member 20, 22 thereby guiding the sliding panel 14 as it moves between the open and closed positions. Preferably, the shoe 36 has a body portion 38 that extends along the sliding panel 14 and a heel portion 40 extending from the body portion 38 into the channel 24. The heel portion 40 of the shoe 36 presents a shoe length Ls that is parallel with the track member 20, 22. The heel portion 40 is laterally offset from the body portion 38 and the sliding panel 14 as shown in FIG. 4. The shoe 36 can be integrally molded about the sliding panel 14. However, in the preferred embodiment the shoe 36 further has a tab portion 42 that extends from the body portion 38 and engages the sliding panel 14. Referring to FIG. 8A and 8B, the sliding window assembly 10 includes a connection element 44 disposed between the tab portion 42 of the shoe 36 and the sliding panel 14. The connection element 44 can include an adhesive, an encapsulation, and/or a fastening device, such as a screw or rivet, or any mechanism suitable to secure the tab portion 42 to the sliding panel 14. In addition, one skilled in the art would know of the many possibilities to secure the tab portion 42 to the sliding panel 14, and the above list is not intended to be inclusive.

The sliding window assembly 10 further includes an insert 46 that is removably disposed in the gap 32 defined by the track member 20, 22. The insert 46 prevents the removal of the heel portion 40 through the gap 32 during the movement of the sliding panel 14 between the open and closed position. A fastening device 48 secures the insert 46 to the track member 20, 22. The fastening device 48 preferably includes a screw that extends through the insert 46 parallel to the walls 28, 30 of the track member 20, 22 for retaining the insert 46 in the gap 32. However, one skilled in the art would realize that the fastening device 48 could be many possible mechanisms suitable for removably securing the insert 46 in the gap 32.

Figure 5:
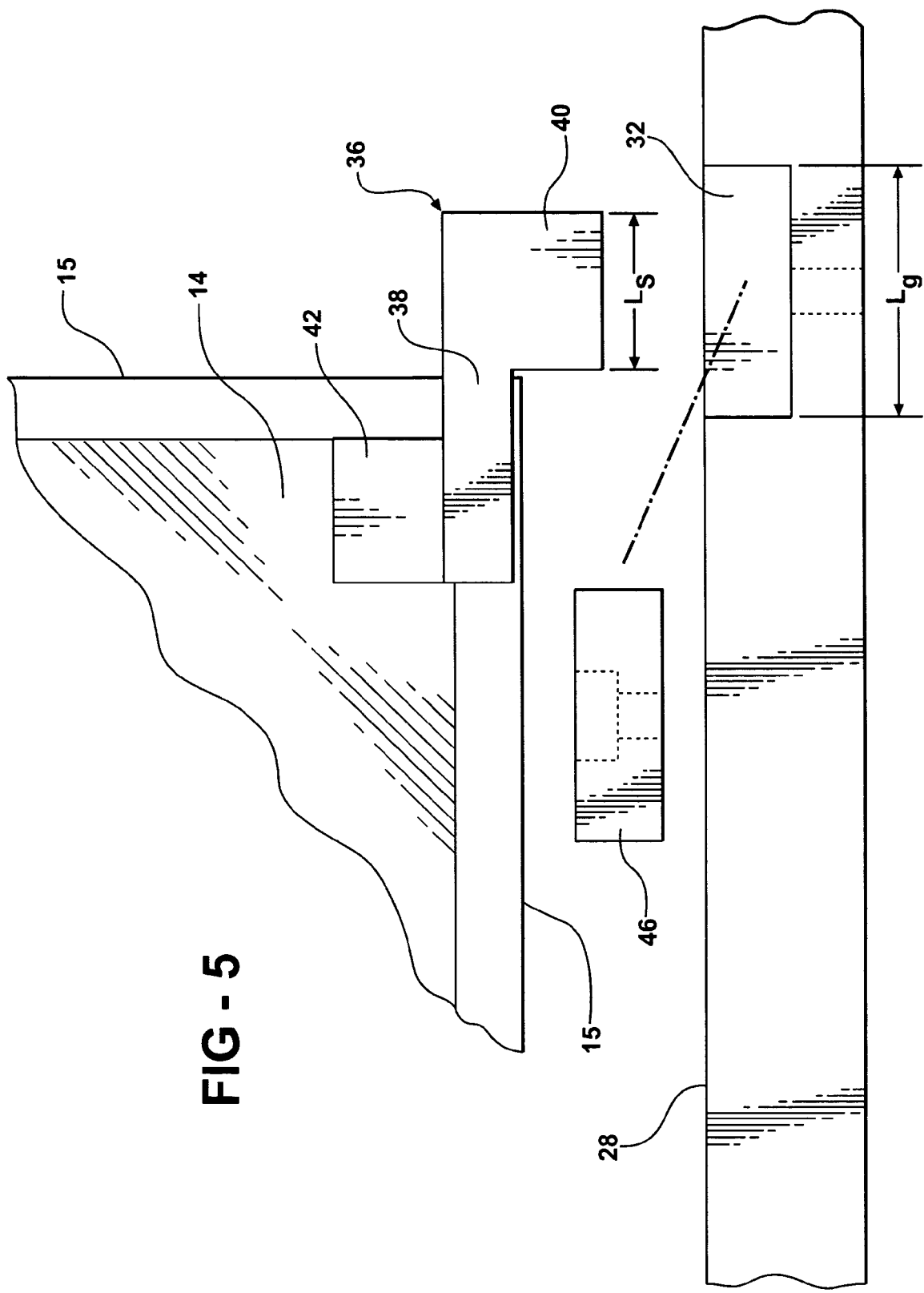
FIG. 5 is a detailed partial exploded side view of a sliding panel and track member.

The sliding panel 14 is removable from the track member 20, 22 by aligning the heel portion 40 of the shoe 36 with the gap 32. As shown in FIG. 5, the shoe length Ls is less than that of the gap length Lg which allows the heel portion 40 of the shoe 36 to pass through the gap 32 to remove the sliding panel 14 from the channel 24 of the track member 20, 22.

Figure 6:
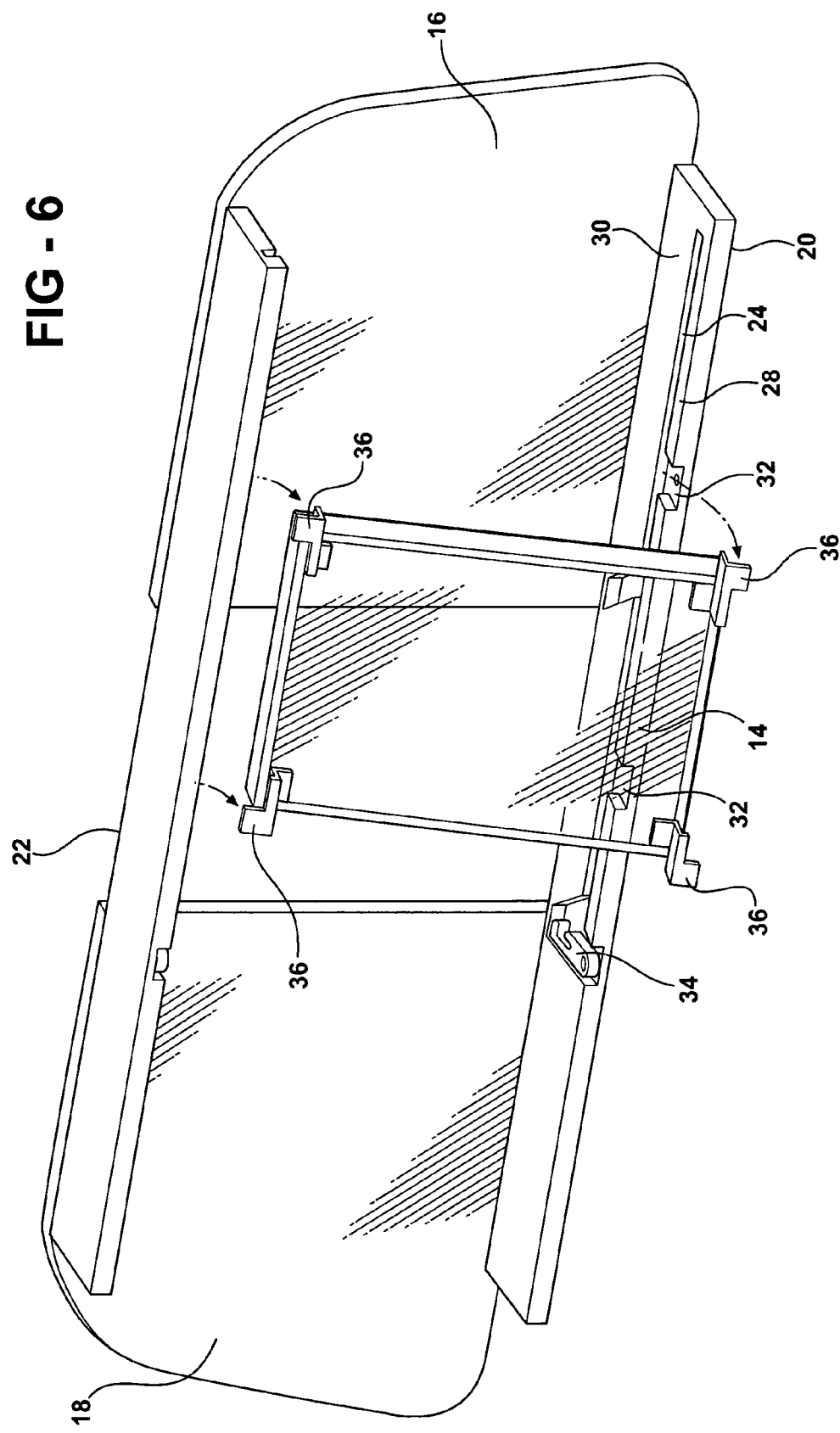
FIG. 6 is a perspective view of the preferred embodiment of the sliding window assembly with the sliding panel removed from the assembly.

Referring to FIG. 6, the preferred embodiment includes two gaps 32 defined by the first track member 20. The inserts 46 are removed to allow the heel portion 40 of the shoes 36 to slide laterally through the gap 32 of the first track member 20. Once the sliding panel 14 is removed from the first track member 20, the sliding panel 14 is then lowered such that the heel portion 40 of the opposing shoe 36 is removed from the channel 24 of the second track member 22. The preferred embodiment of the sliding window assembly 10 includes the use of two gaps 32 on the first track member 20, however, one skilled in the art would understand that there are many different combinations of gaps and shoes, some of which will be described further below. Now referring to FIGS. 8A and 8B, the sliding panel 14 is guided from the closed position by the cam mechanism 34. As shown in FIG. 8A, the cam mechanism 34 engages the heel portion 40 of the shoe 36 to guide the sliding panel 14 to an offset position such that it can be moved between the open and closed position. The cam mechanism 34 guides the heel portion 40 of the shoe 36 laterally along the track members 20, 22 moving the sliding panel 14 out of the closed position, where the sliding panel 14 is flush with the fixed panels 16, 18, and into the offset position. The sliding panel 14 can then be moved from the offset portion to the open position. The sliding panel 14 is moved to the open position, offset of the fixed panels 16, 18, as the shoe 36 is guided into the channel 24 by the cam mechanism 34. The shoe 36 guided by the channel 24 supports the sliding panel 14 as it moves between the open and closed position to modify the size of the opening between the fixed panels 16, 18. As appreciated by those skilled in the art, the sliding panel 14 can be moved along the track member 20 manually, i.e., by hand, or automatically, i.e., by a motor or other mechanical actuator, with additional mechanical assists for guiding the sliding panel 14, such as the cam mechanism 34.

Figure 9A:
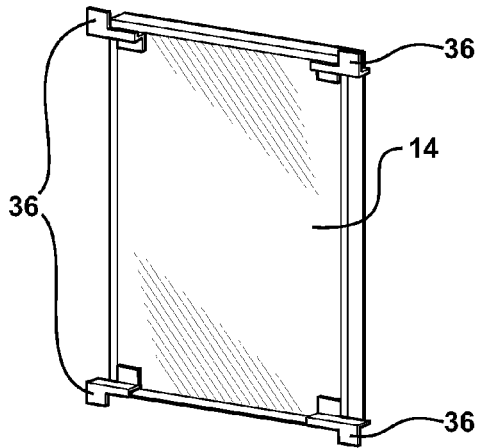
FIG. 9A is a perspective view of the preferred embodiment of the sliding panel.
Figure 9B:
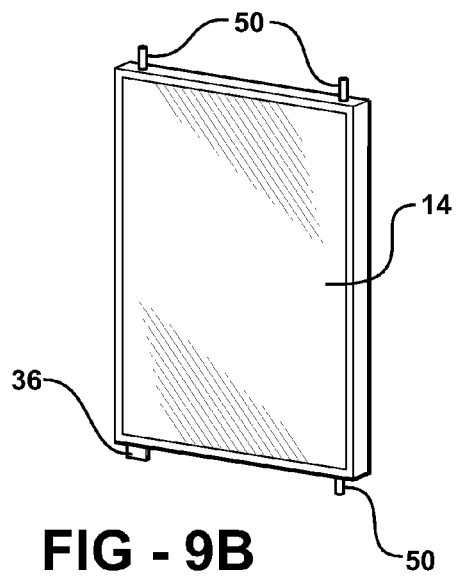
FIG. 9B is a perspective view of an alternative embodiment of the sliding panel with a shoe integrally molded about the sliding panel.
Figure 9C:
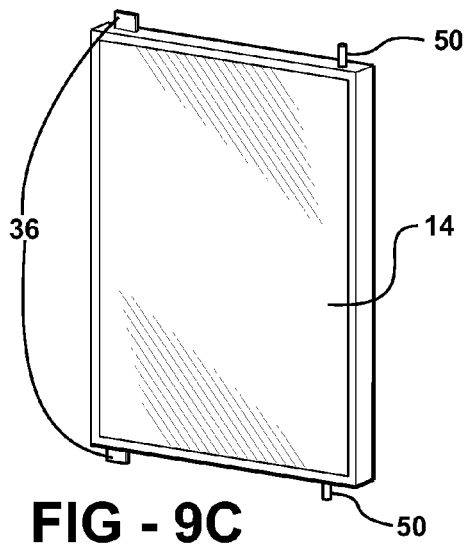
FIGS. 9C and 9D are a perspective view of an alternative embodiment of the sliding panel with two shoes and two posts, one of each disposed on opposing edges.
Figure 9D:
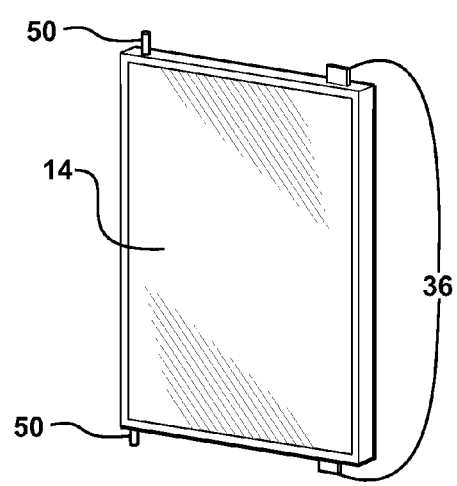
Figure 9E:
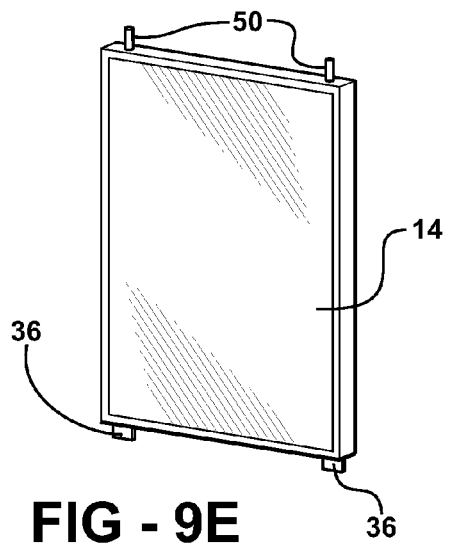
FIGS. 9E and 9F are a perspective view of an alternative embodiment of the sliding panel with two shoes disposed on an edge and two posts disposed on an opposing edge.
Figure 9F:
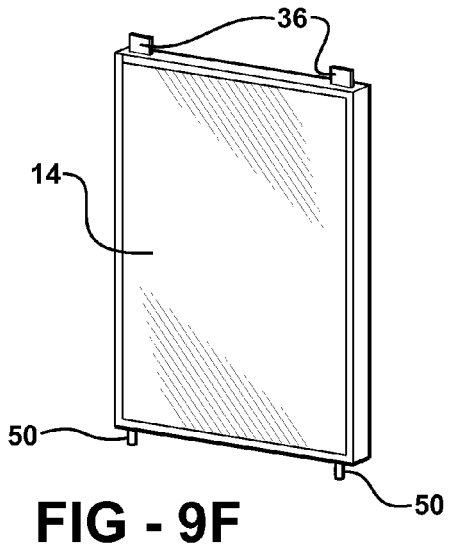

Referring now to FIGS. 9A to 9F, one skilled in the art would understand that there are many possible arrangements of the shoes 36 on the sliding panel 14. The sliding window assembly 10 includes at least one of the shoes 36 disposed on each of the edges 15 of the sliding panel 14 to engage the channel 24 of the first and second track members 20, 22. In the preferred embodiment shown in FIG. 9A, the sliding panel 14 includes four shoes 36 with two shoes 36 on each of the opposing edges 15 of the sliding panel 14 arranged to engage the track members 20, 22. There are many alternatives to support the sliding panel 14 on the track member 20, 22 including the use of at least one post 50 disposed on each of the edges 15 of the sliding panel 14 and engaging the channel 24 of the first and second track members 20, 22. As shown in FIG. 9B, the shoe 36 is integrally molded about the sliding panel 14 and three posts 50 support the sliding panel 14 on the track members 20, 22. Now referring to the FIGS. 9C, 9D, 9E and 9F, it is to be understood that various combination of posts 50 and shoes 36 are possible. For example as shown in FIGS. 9C and 9D, the sliding panel 14 includes two opposing shoes 36 and posts 50. In an additional example, shown in FIGS. 9E and 9F, the sliding panel 14 includes two shoes 36 on one edge 15 engaging into the first track member 20 with two posts 50 on the opposing edge 15 engaging into the second track member 22. It is appreciated by one skilled in the art that the removal of the sliding panel 14 is accomplished by the track members 20, 22 defining gaps 32 at locations such that the shoe 36 is able to slidably pass through the gap 32 for removing the sliding panel 14 from the track members 20, 22. In addition, one skilled in the art would realize that the sliding panel 14 supported by the posts 50 can be pivoted about the post 50 to facilitate additional possibilities for the removal of the sliding panel 14. The posts 50 would then also slidably pass through the gap 32. Additionally, the posts 50 may be retractable, i.e., biased by a spring, or removable from the sliding panel 14 to allow for removal of the sliding panel 14 from the track members 20, 22.

Obviously, many modifications and variations of the present invention are possible in light of the above teachings. The invention may be practiced otherwise than as specifically described within the scope of the appended claims.

What is claimed is:

1. A sliding window assembly for a vehicle comprising:
a track member including a base and a front wall extending from said base and a back wall spaced from and parallel to said front wall and extending from said base to define a generally U-shaped channel defined between said front and back walls,
a sliding panel being moveable along said track member between an open position and a closed position,
said sliding panel having a generally planar major surface,
a pair of shoes each having a unitary, one piece construction immovably connected to and supporting said sliding panel on said track member as said sliding panel moves between said open and closed positions,
each said shoe having a tab portion immovably mounted on said sliding panel generally parallel to said planar surface, a body portion extending generally perpendicularly away from said tab portion and said generally planar surface of said sliding panel, and a heel portion extending generally perpendicularly away from said body portion and generally parallel to said tab portion into said channel and slidably engaging said track member,
each said heel portion having a heel length parallel with a longitudinal axis of said track member,
said front wall defining a pair of gaps extending laterally through said front wall and into said channel and each of said gaps having a gap length along said longitudinal axis of said track member,
each said heel length being less than each said gap length to allow each said heel portion to be aligned with and to pass through a respective one of said gaps for removing said sliding panel from said channel of said track member, and
said shoes being mounted on said sliding panel such that said shoes are spaced apart from one another along said longitudinal axis of said track member, wherein each said heel portion extends at least partially beyond a respective lateral edge of said sliding panel.

2. A sliding window assembly as set forth in claim 1 wherein said track member includes an insert removably disposed in at least one of said gaps to prevent removal of a respective one of said heel portions through said at least one of said gaps when said insert is disposed in said at least one of said gaps.

3. A sliding window assembly as set forth in claim 2 including a fastening device for attaching said insert to said track member.

4. A sliding window assembly as set forth in claim 3 wherein said fastening device includes a screw extending through said insert parallel to said walls of said track member.

5. A sliding window assembly as set forth in claim 1 wherein said track member comprises first and second said track members disposed in an opposing and parallel relationship with each other.

6. A sliding window assembly as set forth in claim 5 wherein said heel portions of said shoes extend into said channel of at least one of said first and second track members.

7. A sliding window assembly as set forth in claim 1 including at least one fixed panel that is disposed in the same plane as and abuts said sliding panel when said sliding panel is in said closed position.

8. A sliding window assembly as set forth in claim 7 wherein said fixed panel comprises first and second fixed panels fixed in a spaced relationship with respect to each other and defining an opening therebetween.

9. A sliding window assembly as set forth in claim 1 further including connection elements disposed between said tab portions and said sliding panel for connecting said tab portions of said shoes to said sliding panel.

10. A sliding window assembly as set forth in claim 1 further including a cam mechanism for engaging said heel portion of at least one of said shoes to move said sliding panel between said open and closed positions.

11. A sliding window assembly as set forth in claim 1 wherein said shoes are integrally molded about said sliding panel.

12. A sliding window assembly as set forth in claim 1 wherein said heel portion of at least one of said shoes has a heel width wherein said heel length is greater than said heel width.

* * * * *

UNITED STATES PATENT AND TRADEMARK OFFICE
CERTIFICATE OF CORRECTION

PATENT NO. : 7,584,574 B2 Page 1 of 1
APPLICATION NO. : 10/928048
DATED : September 8, 2009
INVENTOR(S) : Kinross et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Fourteenth Day of September, 2010

David J. Kappos
*Director of the United States Patent and Trademark Office*